United States Patent [19]

Oka

[11] Patent Number: 4,535,614

[45] Date of Patent: Aug. 20, 1985

[54] METHOD OF GAUGING AND CONTROLLING WORKPIECE PROFILE IN A ROLLING MILL

[75] Inventor: Toshihiro Oka, Muroran, Japan

[73] Assignee: Nippon Steel Corporation, Tokyo, Japan

[21] Appl. No.: 502,392

[22] Filed: Jun. 8, 1983

[51] Int. Cl.³ ............................................. B21B 37/02
[52] U.S. Cl. ...................................................... 72/16
[58] Field of Search ................ 72/16, 11, 37; 364/472

[56] References Cited

U.S. PATENT DOCUMENTS 3,526,113 9/1970 McNaugher .............................. 72/16
3,650,135 3/1972 Skelton et al. ........................... 72/16
4,139,890 2/1979 Yerkes et al. ........................ 364/472

FOREIGN PATENT DOCUMENTS 23729 3/1978 Japan .
100952 8/1979 Japan .

Primary Examiner—E. Michael Combs

Attorney, Agent, or Firm—Pollock, Vande Sande & Priddy

[57] ABSTRACT

Disclosed is a method of gauging the diameter of a moving bar or like workpiece in a rolling mill comprising the steps of continuously gauging diameters at peripheral positions of the workpiece by a diameter gauge adapted to continuously rotate around the workpiece, and computing and displaying a roll-free diameter Df together with a maximum diameter Dx and a minimum diameter Dn of the workpiece, other than the diameter Df, during every half rotation of the diameter gauge. Also disclosed is a method of controlling the size of such a workpiece comprising the steps of controlling the roll gap of a No. i rolling stand on the basis of the thus computed maximum diameter Dx and minimum diameter Dn of the workpiece so as to attain equality between the value of Dn+(Dx−Dn)/2 and the desired diameter $\overline{D}$, and controlling the interstand tension or the roll gap of a No. (i−1) rolling stand so as to maintain the value of Df constant between the values of Dx and Dn.

8 Claims, 14 Drawing Figures

METHOD OF GAUGING AND CONTROLLING WORKPIECE PROFILE IN A ROLLING MILL

BACKGROUND OF THE INVENTION

This invention relates to a method of gauging on a real time basis the sectional shape or profile of a moving bar or like workpiece being hot rolled in a rolling mill and relates also to a method of controlling the profile of the workpiece on the basis of the gauged data.

DESCRIPTION OF THE PRIOR ART

Figure 1:
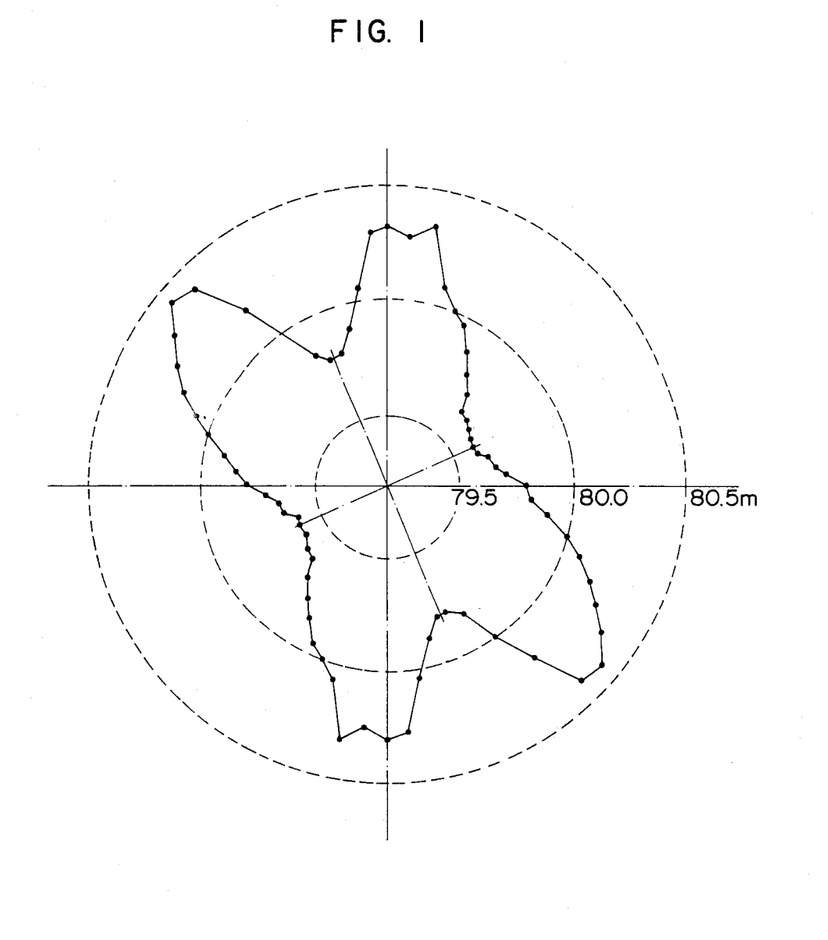
FIG. 1 shows profile data plotted when the profile of a rolled steel bar 80 mm in diameter is gauged by a micrometer at angular intervals of 5°.

According to the Japanese Industrial Standards (JIS), the diametral tolerance of a bar or like workpiece hot rolled in a rolling mill is generally set to be within ±1.5% of the workpiece diameter. However, a severe diametral tolerance of ±0.5% is now demanded with the recent remarkable progress of technology and to meet the demands of customers who want to dispense with the steps of drawing and/or peeling. In a rolling mill designed to hot roll a bar or like workpiece to within such a severe diametral tolerance, a profile gauge having two orthogonal gauging axes is disposed, for example, on the downstream side of a rolling stand to adjust the size of the workpiece while continuously checking the top-bottom dimension (the dimension of the workpiece between the points engaging the top and bottom of the bore defined between the opposing rolls) and the breadth or roll-free dimension (the dimension between the roll-free regions of the surface) of the workpiece. However, because of the fact that the workpiece has a complex profile which cannot be approximated by a circular or elliptical shape, the desired overall size or profile of the workpiece cannot be guaranteed by merely gauging the top-bottom and roll-free dimensions of the workpiece by the profile gauge. For example, FIG. 1 shows the sectional shape or profile of a steel bar 80 mm in diameter when the diameter data of the bar gauged at angular intervals of 5 degrees by a micrometer are plotted. It will be seen from FIG. 1 that it is impossible to determine the maximum and minimum diameter values of the bar by merely gauging with the gauge of the type having the two orthogonal gauging axes. It is therefore apparent that more accurate control of the bar size is a matter of impossibility although it is strongly demanded.

It is commonly known that the diameter of a bar or like workpiece is largest in the direction of the so-called shoulder regions lying intermediate between the top-bottom regions and the roll-free regions, and the shoulder dimension changes greatly in response to a very slight angular change as will be readily seen in FIG. 1. Therefore, it is very difficult to accurately set the gauge of the orthogonal gauging axis type at the angular position corresponding to the maximum diameter given by the shoulder dimension because of the fact that a twist is imparted to the workpiece being rolled, and it is also difficult to gauge the minimum diameter together with the maximum diameter with such a gauge.

Therefore, although such a gauge has been used as means for regulating or controlling the reduction or roll gap of the rolling stand rolling the workpiece, it has been impossible for such means to guarantee the quality of the product so as to maintain the diameter of the product between a maximum allowable limit and a minimum allowable limit. It has therefore been a common practice that the final products obtained after cold rolling and shearing of the workpiece are checked one by one by means of a limit gauge to confirm that each of them meets the allowable tolerance in size.

In an effort to solve these problems, various rotary types of apparatus for gauging a bar or like workpiece have been developed and put into practical use, as described below.

For example, such apparatus are disclosed in Japanese Utility Model Application No. 20271/78 (referred to hereinafter as an earlier application No. 1), Japanese Utility Model Application No. 23729/78 (referred to hereinafter as an earlier application No. 2) and Japanese Patent Application No. 100952/79 (referred to hereinafter as an earlier application No. 3).

The earlier application No. 1 relates to the basic structure itself of a rotary workpiece gauging apparatus. The earlier application No. 2 is featured by the fact that the apparatus disclosed in the earlier application No. 1 is combined with means for displaying and recording specific angles and gauged diameter data at those angles. The earlier application No. 3 is featured by the fact that the apparatus disclosed in the earlier application No. 1 is combined with means for computing and displaying the maximum and minimum diameter data among all of the diameter data gauged at the entire periphery.

Among the earlier applications Nos. 1, 2 and 3 above described, the apparatus disclosed in the earlier application No. 3 is only usable for the purpose of checking as to whether or not the diameter of a workpiece being rolled lies within the dimensional tolerance, and it does not generate any information required for the regulation of the size of the workpiece. Japanese Patent Application No. 37964/79 (referred to hereinafter as an earlier application No. 4) filed in 1979 is featured by the fact that the apparatus disclosed in, for example, the earlier application No. 1 is combined with means for magnifying the errors of the diameter data gauged on the entire periphery of a workpiece from the standard true circle and displaying such errors on a cathode-ray tube. This earlier application No. 4 provides a guidance to a rolling mill operator in regard to the manner of regulation of the size of the workpiece.

Description will now be directed to wear of rolls rolling, for example, a bar and to a manner of regulation of the roll gap for compensating roll wear when the latter is present.

Figure 2A:
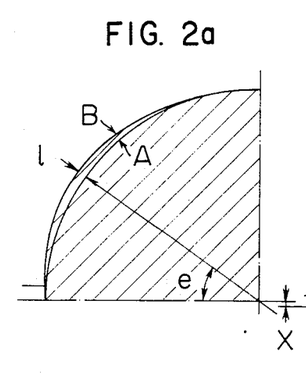
FIGS. 2a and 2b illustrate wear of rolls and how the roll gap is corrected to compensate for wear of the rolls.

FIG. 2a shows the section of the upper left half of an upper roll rolling a bar between it and a lower roll. In FIG. 2a, the locus A represents the profile of the roll in the initial stage of participation in rolling, that is, immediately after it is incorporated in the rolling stand, and the locus B represents the profile of the roll in the last stage of participation in rolling, that is, immediately before it is to be rearranged due to wear. It will be seen in FIG. 2a that, because of the relation between the roll bore and the shape of the workpiece entering the nip of the rolls (the elliptical shape in this case), wear occurs most markedly in the regions of the right and left shoulders. The maximum wear is designated by 1 in FIG. 2a. Since the locus A is initially adjusted so that the top-bottom diameter of the product is substantially equal to the desired diameter $\overline{D}$, the diameter of the product after occurrence of the wear lies between $\overline{D}$ and $(\overline{D}+1)$. The diameter error relative to the value of $\overline{D}$ is invariably positive and becomes a large value.

Figure 2B:
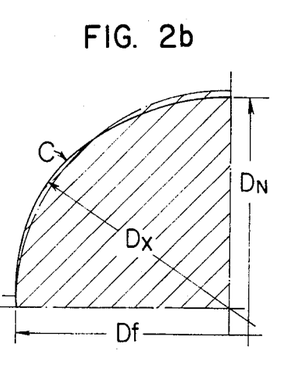

Therefore, it is a common practice that the upper roll is screwed down by an amount X to compensate for the maximum wear l so that the locus B is now shifted to the locus C shown in FIG. 2b. Thus, the deviations are distributed in the positive and negative directions to minimize the errors from the desired diameter $\overline{D}$. In FIG. 2b, therefore, the maximum diameter Dx and minimum diameter Dn of the workpiece correspond generally to the left-right shoulder dimension and top-bottom dimension respectively. Since the values of Dx and Dn are changeable depending on the roll wear, steel workpiece grade, rolling temperature and other factors, the roll gap must be adjusted in each case so as to minimize the errors of Dx and Dn from the desired diameter $\overline{D}$.

In the case of the locus C shown in FIG. 2b, the value of the roll-free diameter Df lies intermediate between the values of the maximum and minimum diameters Dx and Dn. FIG. 2b illustrates an ideal case, and, therefore, the roll-free diameter Df may become larger than Dx or smaller than Dn depending on circumstances. Although the value of the roll-free diameter Df after the roll gap control may be selected to be any suitable one without affecting the maximum error of all the diameters from the desired diameter $\overline{D}$, provided that the value of Df lies between those of Dn and Dx, the value of Df is preferably as to close to that of Dn when the product yield rate is taken into consideration. The dimension Df is adjusted by adjusting the interstand tension or the entry-side shape of the workpiece. Although the information of Df, Dx and Dn are thus indispensably required for the control of the size of the workpiece, no consideration has been taken hitherto for such information.

Figure 3:
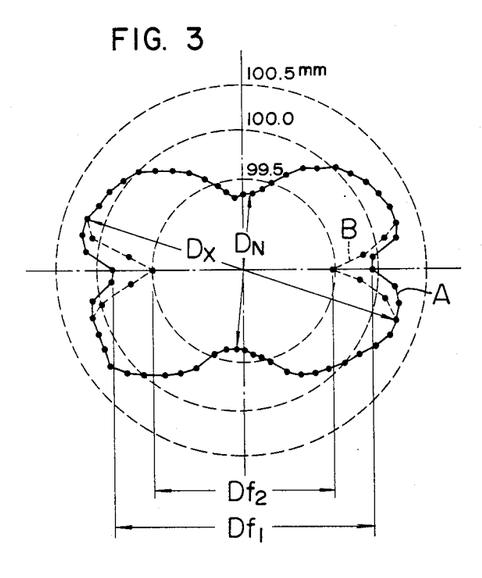
FIG. 3 shows profile data plotted by a rotary workpiece gauging apparatus when a steel bar 100 mm in diameter is rolled under the condition of no interstand tension.

FIG. 3 shows the profile of a steel bar of 100 mm in diameter when the steel bar is rolled under the condition of no interstand tension, and data recorded by a rotary gauging apparatus are plotted. The locus B in FIG. 3 represents the bar profile when the material at the entry side of the rolling stand disposed upstream of the rotary gauging apparatus has a reduced section, while the locus A represents the bar profile before being reduced in its section. It will be seen in FIG. 3 that the roll-free diameter is reduced from Df1 to Df2 as a result of reduction of the section of the entry-side material.

The so-called tension control controlling the interstand tension to be zero or a small value has hitherto been used as a method for controlling the shape of a bar or like workpiece. This method has based on the idea of controlling the interstand tension to be zero or a small fixed value to maintain constant the roll-free diameter Df thereby making uniform the overall shape of a bar or like workpiece, because, in the case of rolling such a workpiece, the rolling force is small compared with that imparted for rolling other workpieces such as a thick steel plate, a hot rolled steel strip and a shape steel and the change of the top-bottom dimension due to a rolling force change is relatively small.

However, it is to be noted that to maintain constant the interstand tension is only effective for uniformalizing variations of the roll-free diameter Df relative to the desired diameter $\overline{D}$ throughout the length of the workpiece and is not necessarily effective for minimizing such a variation.

SUMMARY OF THE INVENTION

It is an object of the present invention that a diameter gauge adapted to continuously rotate around the axis of a bar or like workpiece is used to continuously gauge the diameters at various peripheral positions of the workpiece, and the data of at least two diameters selected from among many gauged data taking into account the profile characteristic of such a workpiece subjected to rolling are displayed so that the profile of the workpiece being rolled can be accurately understood.

Another object of the present invention is to provide a workpiece profile control method in which the data of the workpiece diameters obtained in the manner above described are used to regulate the controlled variable or variables of the rolling stand or stands so as to accurately control the size of the workpiece.

An embodiment of the method of gauging the diameter of a bar or like workpiece according to the present invention comprises the steps of continuously gauging diameters at peripheral positions of the workpiece by means of a diameter gauge adapted to continuously rotate around the axis of the workpiece, and computing and displaying a roll-free diameter Df together with a maximum diameter Dx and a minimum diameter Dn of the workpiece, other than the diameter Df, during every half rotation of the diameter gauge while, at the same time, computing and displaying the corresponding peripheral directions of Dx and Dn.

An embodiment of the method of controlling the size or profile of a bar or like workpiece according to the present invention comprises at least the step of controlling the controlled variables of the rolling stand or stands, including those pertinent to the tension imparted to the workpiece and/or the reduction or roll gap, so that the values of Dx and Dn computed in the manner above described can satisfy a predetermined relation.

According to the present invention, the profile of a bar or like workpiece can be accurately understood or detected, and the overall diameter errors from the desired diameter can be minimized regardless of roll wear, steel workpiece grade and changes of the factors including the rolling temperature and dimensional tolerance.

DESCRIPTION OF THE PREFERRED EMBODIMENTS

Figure 4:
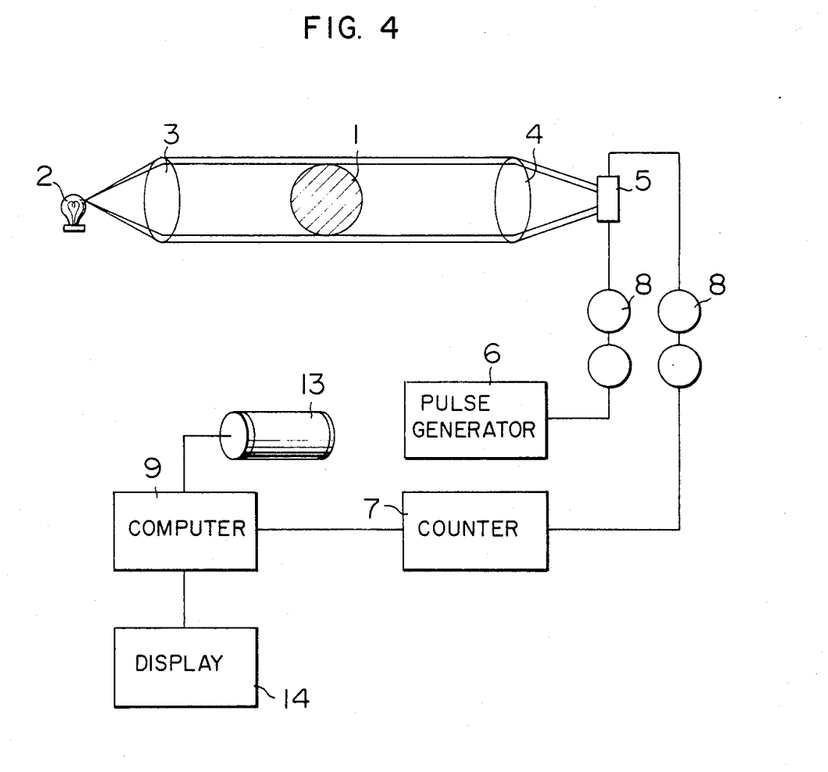
FIG. 4 is a diagrammatic view showing the flow of an output signal from a rotary workpiece gauging apparatus preferably used for the practice of the method of the present invention.

FIG. 4 shows the structure of a rotary type of workpiece diameter gauging apparatus preferably employed for the practice of the method of the present invention.

Referring to FIG. 4, light emitted from a light source 2 passes through a lens 3 to be rendered into a parallel light beam, and the shadow of, for example, a bar 1 passes through a receptor lens 4 to be focused on a photoelectric converter array 5. In FIG. 4, this photoelectric converter array 5 is in the form of, for example, a charge coupled device (CCD) or a bucket brigade device (BBD).

A shift pulse signal is applied from a pulse generator 6 to the photoelectric converter array 5 through a slip ring assembly 8 so that a pulse train corresponding to the relative brightness of the diameter image of the bar 1 projected onto the photoelectric converter array 5 appears therefrom to be counted by a pulse counter 7. This counting operation is repeated at a predetermined period for the purpose of averaging the count, and the data of the diameter value converted into the pulse count is transmitted to a computer 9. In order to recognize the angular relation between the gauged diameter of the bar 1 and the vertical, an output signal from an angle sensor 13 is also applied to the computer 9, and a display unit 14 is connected to the computer 9.

Figure 5:
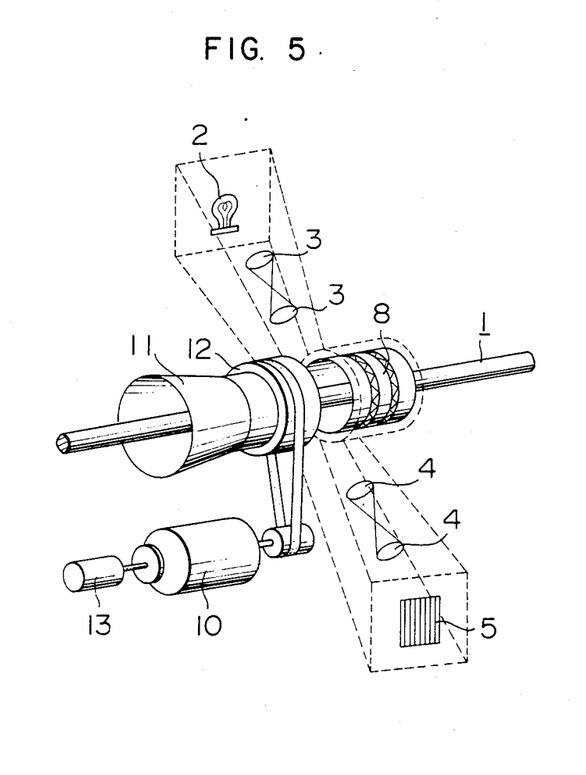
FIG. 5 is a schematic perspective view of the apparatus shown in FIG. 4.

Referring to FIG. 5 which is a schematic perspective view of the mechanism of the gauging apparatus, the light source 2, lenses 3, 4, photoelectric converter array 5, slip ring assembly 8, pulse generator and pulse counter 7 shown in FIG. 4 are integrally mounted on a rotary member 12 which is continuously rotated in one direction by a motor 10 around the axis of a stationary part 11. The slip ring assembly 8 mounted on the rotary member 12 cooperates with a brush assembly (not shown) for the purposes of power supply and signal transmission and reception.

In the form shown in FIGS. 4 and 5, the pulse counter 7 is disposed in the rotary member 12 to make its counting operation, and the result of counting is derived through the signal transmitting and receiving means composed by the slip ring assembly 8 and the brush assembly (not shown). However, the pulse counter 7 may not be disposed in the rotary member 12 and may be disposed outside of the member 12, and the pulse train signal appearing from the photoelectric converter array 5 in response to the shift pulse signal and transmitted through the signal transmitting and receiving means may be counted by the pulse counter 7 which is disposed on the stationary side in such a case. Further, the slip ring assembly 8 provided for the signal transmission may be replaced by an electromagnetic coupling or a suitable optical device.

The angle sensor 13 is coupled to the drive motor 10 to generate an angle signal each time the gauging members 2 to 5 rotate through a predetermined angle $\theta$ from a reference direction which is, for example, the vertical direction. Since the rotary gauging apparatus is of the image projection type, it gauges the diameters between the same regions of the workpiece during every 180° rotation, and the value of $\theta$ is 180°/n.

In an embodiment of the workpiece gauging method which is one of the methods according to the present invention, the diameter data gauged by the gauging apparatus are arithmetically processed by the computer 9 and displayed on the display unit 14. Each time the angle sensor 13 senses the $\theta$° rotation of the gauging members 2 to 5, the count output signal from the pulse counter 7 is applied to the computer 9. The count output signal from the pulse counter 7 in this case is indicative of the count corresponding to the average diameter since the pulse trains applied from the photoelectric converter array 5 during the $\theta$° rotation of the gauging members 2 to 5 are continuously integrated. The n diameter data inputs applied during the 180° rotation of the gauging members 2 to 5 are stored in the computer 9 together with their angle identification numbers in the sequential order.

When thus the number of applied diameter input data attains the value n, the roll-free diameter Df and the maximum and minimum diameters Dx and Dn, other than the roll-free diameter Df, are computed on the basis of the input data.

Figure 6A:
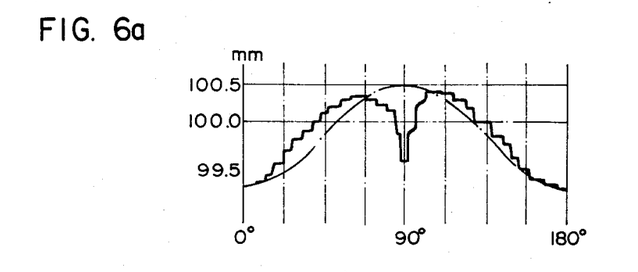
FIGS. 6a and 6b illustrate a manner of signal processing.
Figure 6B:
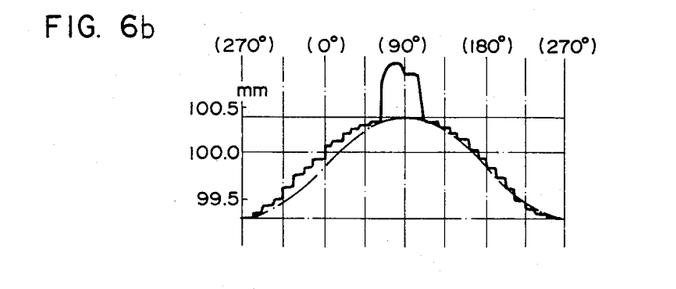

FIGS. 6a and 6b show a manner of signal processing. The stepped solid curve shown in each of FIGS. 6a and 6b represents data recorded on a pen recorder when the output signal from the rotary gauging apparatus disclosed in the earlier application No. 1 is applied to the recorder during rolling of a steel bar having a diameter of 100 mm. The chart sheet is fed rightward, and the diameter data input signal from the apparatus is recorded in the longitudinal direction. This is equivalent to the case where the n diameter data applied to the signal processing unit are plotted from the left to the right in the order of input data application. The angle shown without parentheses in FIG. 6a indicates the rotation angle of the apparatus, and the rotation of 180° corresponds to plotting of all the diameter data. In this example, the change of the diameter data, namely, the deviation from the desired diameter of the workpiece, is approximated by a regression curve $Y = A \sin \phi$. The angle shown with parentheses in FIG. 6b indicates the value of $\phi$ in the regression curve, and the maximum deviation in the diameter at $\phi = 90°$ corresponds to the roll-free diameter Df of the bar. The zero value position of $\phi$ is selected so that the regression curve best approximates the actual measured deviations as shown in FIG. 6b. FIG. 6a corresponds to the case where a large tension is imparted between the rolling stands or the size of the material entering the nip of the rolls is small. Thus, the actual value of the diameter at $\theta = 90°$ is smaller than the value of $A \sin \phi$. FIG. 6b corresponds to the contrary case, and the actual value of the diameter at $\theta = 90°$ is larger than the value of $A \sin \phi$. Therefore, the data corresponding to $A \sin \phi$ is indicative of the roll-free diameter Df of the bar, and the largest and smallest data outside of the angular range of $\theta = 60°$–$120°$ in the range of $\theta = 0°$–$180°$ are indicative of the maximum and minimum diameters Dx and Dn respectively. These data are applied together with their angle identification numbers to the display unit 14 shown in FIG. 4. The angle identification number corresponding to the diameter data of the roll-free diameter Df should remain substantially unchanged in a single material or a plurality of materials when the bar is uniformly twisted. Therefore, if a large change occurs on the angle identification number, the computer 9 decides that the signal processing unit is abnormal and interrupts the operation of the signal processing unit.

After the processing in the manner above described, the n diameter data and n angle identification numbers are initialized, and the next period of data processing during next 180° rotation takes place.

Figure 7:
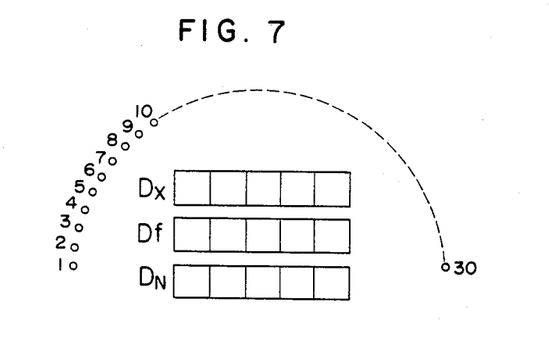
FIG. 7 is a diagrammatic view showing one form of the display unit employed in the present invention.

FIG. 7 illustrates one form of the display unit 14 in which the number of n is selected to be n=30. The roll-free diameter Df and the maximum and minimum diameters Dx and Dn, except the roll-free diameter Df, are digitally displayed by alphanumerical characters, and the individual angles are displayed by 30 tricolor emitting diodes respectively. In FIG. 7, Df, Dx and Dn are displayed in red, green and orange respectively.

Figure 8:
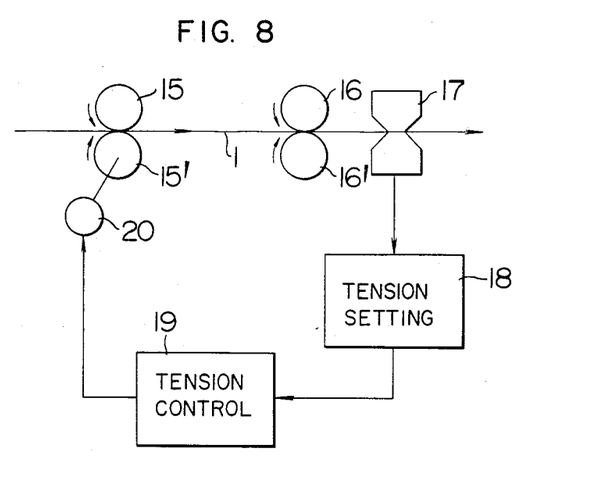
FIG. 8 shows one form of a basic system preferably employed for the workpiece profile control according to the present invention.

FIG. 8 shows an embodiment of a system preferably employed for the practice of the workpiece profile control method by using the measurement results as above-mentioned.

Referring to FIG. 8, a bar or like workpiece 1 to be rolled is fed rightward along the pass line of a rolling mill to pass through the nip of grooved rolls 15, 15' driven by a roll drive motor 20 and then through the nip of grooved rolls 16, 16'. A diameter gauging unit 17 gauges continuously diameters at peripheral positions of the workpiece 1, and the output signal from the diameter gauging unit 17 is applied to a tension setting unit 18, thence to a tension control unit 19.

The workpiece profile control method of the present invention will now be described with reference to FIGS. 8 and 9.

Figure 9A:
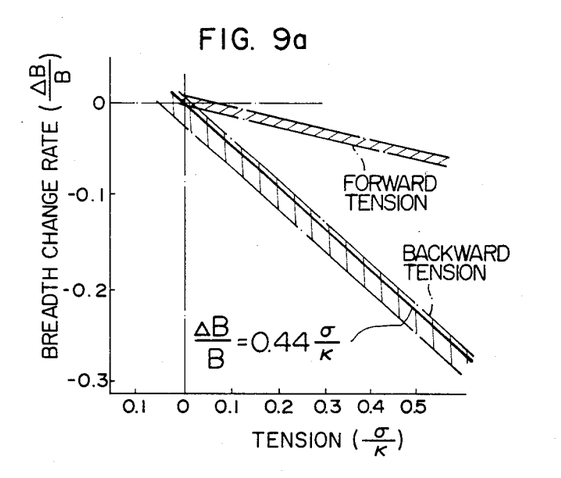
FIG. 9a shows the relation between the tension and a change of the breadth of a workpiece.
Figure 9B:
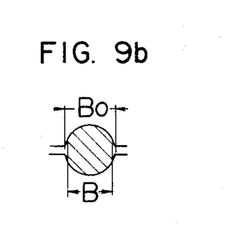
FIG. 9b shows the section of the workpiece.

FIG. 9a shows experimental data to illustrate the relation between the tension imparted to a bar or like workpiece and the change rate of the breadth dimension B (the roll-free dimension Df) of the workpiece. In FIG. 9a, $\Delta B = B - Bo$, where B and Bo are as shown in FIG. 9b. The tension to be imparted to a No. i rolling stand is preferably a backward tension in view of the fact that the present invention is most effective when the No. i rolling stand is the downstream most rolling stand and that the change of the breadth dimension of the workpiece due to impartation of the backward tension is greater than that due to impartation of a forward tension. When thus the backward tension is to be imparted according to the present invention, the desired tension $\bar{\sigma}$ is given by the following equation (1):

$$\bar{\sigma} = \frac{k}{K} \times \frac{(Df - Do)}{Df} \quad (1)$$

where k is the deformation resistance, and K is the tension-breadth change conversion coefficient. Although K=0.44 in the case of FIG. 9a, it varies depending on the roll bore. The symbol Do represents the predetermined diameter to be attained by the tension control, and the value of Do may be any suitable one between those of Dx and Dn depending on the objective.

The signal indicative of the computed value of $\bar{\sigma}$ is applied to the tension control unit 19 shown in FIG. 8, and the rotation speed of the rolls 15 and 15' of the No. (i−1) rolling stand is controlled, so that the tension at the No. (i−1) rolling stand is controlled to be set at $\bar{\sigma}$. FIG. 8 illustrates that the backward tension is controlled for the practice of the method of the present invention, in which the rotation speed of the roll drive motor 20 driving the rolls 15 and 15' of the No. (i−1) rolling stand is corrected and controlled on the basis of the computed value of $\bar{\sigma}$.

Although the tension setting unit 18 and the tension control unit 19 are shown as separate units in FIG. 8, they may be united into a single unit by use of means such as a process computer.

Further, the desired tension $\sigma$ may be computed from the mean values of Df, Dx and Dn determined on a single workpiece and the size of the next workpieces are controlled on the basis of the computed value of $\bar{\sigma}$. Alternatively, the control may be carried out only when the values of Df, Dx and Dn change greatly in a single workpiece.

According to the above-mentioned embodiment, the profile control is carried out so as to maintain the value of Df constant between Dx and Dn, while the mill operator controls the roll gap for the minimization of errors of the diameters at peripheral positions of the workpiece from the desired diameter $\bar{D}$ due to the roll wear and changes of the dimensional tolerance and other factor. In a second embodiment of the invention, this roll gap control is automated. For this purpose, a roll gap control unit is provided to the No. i rolling stand to control the values of Dx and Dn so that the value Dn+(Dx−Dn)/2 becomes equal to the desired diameter $\bar{D}$ under control of the roll gap or reduction control unit, thereby minimizing errors of the diameters at peripheral positions of the product from the desired diameter $\bar{D}$.

Figure 10:
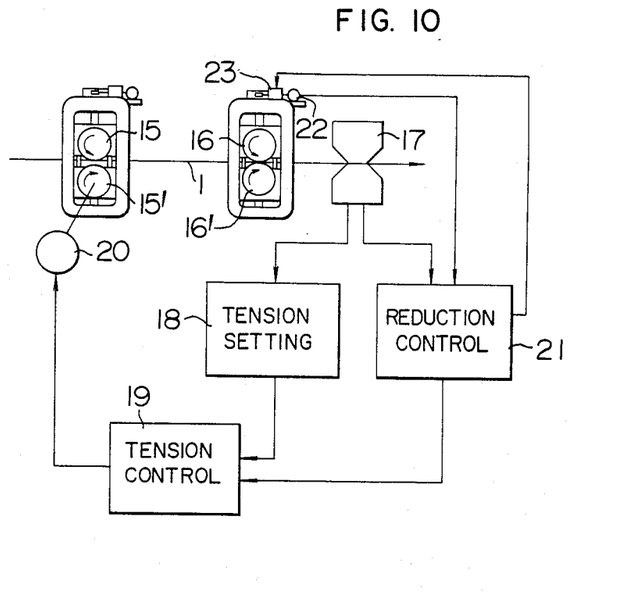
FIGS. 10 and 11 show two practical systems respectively preferably employed in the present invention.

FIG. 10 shows the structure of the second embodiment.

Referring to FIG. 10, the data indicative of Dx and Dn are applied from the diameter gauging unit 17 to a reduction control unit 21. On the basis of these data of Dx and Dn, the reduction control unit 21 computes and controls the correction factor X of the reduction or roll gap at the No. i rolling stand, so that the value of Dn+(Dx−Dn)/2 becomes equal to the desired diameter $\bar{D}$. The value of X is approximated by the following equation (2):

$$X = \frac{2\bar{D} - Dx - Dn}{1 + \sin \theta} \quad (2)$$

The symbol $\phi$ in the equation (2) designates the angle of the position of the maximum diameter Dx measured from the position of the roll-free diameter Df, and there is the relation $0° \leq \theta \leq 180°$. The symbols $\bar{D}$, Dx and Dn in the equation (2) designate the values of the corresponding diameters in a hot rolled state of the workpiece, and the spring-up of the rolls of the rolling stand is neglected.

The control of the roll gap at the No. i rolling stand is such that one of the rolls is urged by the amount X in a direction which sets up or maintains the desired roll gap, and a screw-down motor 23 is controlled on the basis of the input signal, indicative of the present roll gap, applied from a selsyn unit 22.

The system of this embodiment includes also the tension control unit 19 which controls the tension at the No. i rolling stand to set it at $\bar{\sigma}$. In the third method of the present invention, it becomes also necessary to control the rotation speed of the roll drive motor 20 to compensate the change of the mass flow caused by the correction of the roll gap of the No. i rolling stand. To this end, the data of X is applied from the reduction control unit 21 to the tension control unit 19.

In the embodiments of the present invention described above, the tension imparted to the No. i rolling stand is controlled to control the roll-free diameter Df. However, even when the tension of constant value is imparted to the entire length of the material being fed between the No. (i−1) rolling stand and the No. i rolling stand, the shape of the material from its head to the portion released from the nip of the rolls of the No. (i−1) rolling stand will not become uniform.

This phenomenon is attributable to the mutual effect of the interstand tensions. This is because, in a state in which the material is nipped between the rolls of the No. (i−1) and No. i rolling stands at the same time, tensions occur between all of the rolling stands nipping the material between their rolls, and the tension values vary also depending on the number of such rolling stands. Consequently, the final shape of the product becomes non-uniform throughout its length. Although the value of the tension imparted for the control of Df is not so large and, therefore, it varies within a relatively small range in many cases, that poses a problem especially when the dimensional tolerance is very strict.

In a third embodiment as described hereinafter, the above problem is solved thereby to ensure a higher dimensional accuracy of the products. According to this embodiment the roll gaps of the No. (i−1) and No. i rolling stands are controlled to control Df, Dn and Dx, and all the interstand tensions are controlled to be zero or a very small value.

Figure 11:
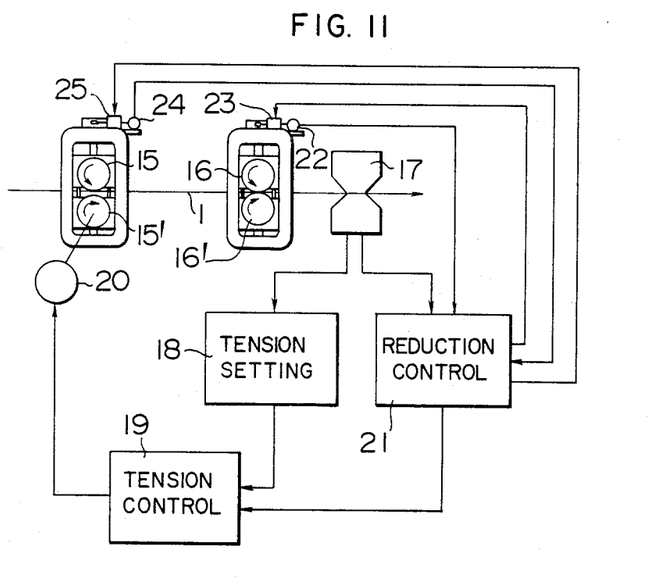

FIG. 11 shows the structure of a system employed for the practice of the fourth method of the present invention. Referring to FIG. 11, the data indicative of Df, Dx and Dn are applied from the diameter gauging unit 17 to the reduction control unit 21. On the basis of these data of Df, Dx and Dn, the reduction control unit 21 computes and controls the correction factor X of the roll gap of the No. i rolling stand and the correction factor that Y of the roll gap of the No. (i−1) rolling stand, so that the value of $Dn+(Dx-Dn)/2$ becomes equal to the desired diameter $\overline{D}$, and the value of Df is maintained constant between those of Dx and Dn. The value of X is computed according to, for example, the equation (2), while the value of Y is computed according to, for example, an experimental formula.

The system of the above-mentioned embodiment includes also the tension control unit 19 which controls all of the interstand tensions to be zero or a very small value. In the fourth method of the present invention, it becomes also necessary to control the rotation speed of the roll drive motor 20 to compensate the change of the mass flow caused by the correction of the roll gaps of the No. i and No. (i−1) rolling stands. To this end, the data of X and Y are applied from the reduction control unit 21 to the tension control unit 19.

It will be understood from the foregoing detailed description of the present invention that not only the size of a bar or like workpiece being rolled can be managed or controlled on a real time basis, but also the rolling mill operator can be provided with data suggestive of required regulation of the workpiece size. The gauging method of the present invention is especially indispensable for an automated gauging apparatus automatically gauging such a workpiece for the purpose of profile control. Also, the profile control method of the present invention is quite useful for the purpose of precision rolling of a bar or like workpiece in that errors of the diameters at peripheral positions of products from the desired diameter can be minimized regardless of roll wear, steel workpiece grade and changes of the rolling temperature, dimensional tolerance and other factors.

I claim:

1. A method of gauging the diameter of a moving bar or like workpiece in a rolling mill, comprising the steps of:

disposing about said workpiece at a gauging station gauging means for continuously gauging diameters at n equally spaced angular positions on the periphery of said workpiece while said gauging means is continuously rotating around the moving workpiece with its axis of rotation registered with the pass line of the rolling mill;

computing and displaying for said workpiece a roll-free diameter Df, and a maximum diameter Dx and a minimum diameter Dn other than said roll-free diameter Df, on the basis of the diameter values gauged by said workpiece gauging means for at least half of the periphery of said workpiece and on the basis of assigning as Df the gauged diameter corresponding to the largest value of Y computed in accordance with the regression curve $Y = A \sin \phi$ where Y is a calculated deviation from a desired diameter of the workpiece, A is a constant representing the maximum deviation when $\phi = 90°$ and $\phi$ is the angle of the position of the deviation Y taken from a zero value position selected so that the regression curve best approximates the actual measured deviations from the desired diameter of the workpiece; and computing and displaying the corresponding peripheral positions of Dx and Dn relative to the peripheral position of said Df at said gauging station, said computation of the diameters and positions of Dx and Dn excluding gauged values in the angular range of 30° to either side of the peripheral position of said Df at said gauging station.

2. A method of controlling the profile of a moving bar or like workpiece in a rolling mill, comprising the steps of:

disposing about said workpiece at a gauging station gauging means for continuously gauging diameters at angular positions on the periphery of said workpiece;

computing for said workpiece a roll-free diameter Df, and a maximum diameter Dx and a minimum diameter Dn other than said roll-free diameter Df, on the basis of the diameter values gauged by said workpiece gauging means for at least half of the periphery of said workpiece and on the basis of assigning as Df the gauged diameter corresponding to the largest value of Y computed in accordance with the regression curve $Y = A \sin \phi$ where Y is a calculated deviation from a desired diameter of the workpiece, A is a constant representing the maximum deviation when $\phi = 90°$ and $\phi$ is the angle of the position of the deviation Y taken from a zero value position selected so that the regression curve best approximates the actual measured deviations from the desired diameter of the workpiece;

computing the corresponding peripheral positions of Dx and Dn relative to the peripheral position of said Df at said gauging station, said computation of the diameters and positions of Dx and Dn excluding gauged values in the angular range of 30° to either side of the peripheral position of said Df at said gauging station;

computing and setting a value for the desired tension $\sigma$ to be imparted to a No. i rolling stand disposed next upstream of said workpiece gauging station for maintaining the value of Df constant and between the values of Dx and Dn; and controlling the rotation speed of the rolls of a No. (i−1) rolling stand disposed next upstream of said No. i rolling stand to establish said desired tension.

3. A method as claimed in claim 2, further comprising the step of:

controlling the roll gap at said No. i rolling stand to attain equality between the value of Dn+(Dx−Dn)/2 and the desired diameter $\overline{D}$ by changing a correction factor X of the roll gap of said No. i rolling stand on the basis of the computed values of Dx and Dn.

4. A method of controlling the profile of a moving bar or like workpiece in a rolling mill, comprising the steps of:

disposing about said workpiece at a gauging station gauging means for continuously gauging diameters at angular positions on the periphery of said workpiece;

computing for said workpiece a roll-free diameter Df, and a maximum diameter Dx and a minimum diameter Dn other than said roll-free diameter Df, on the basis of the diameter values gauged by said workpieces gauging means for at least half of the periphery of said workpieces and on the basis of assigning as Df the gauged diameter corresponding to the largest value of Y computed in accordance with the regression curve Y=A sin φ where Y is a calculated deviation from a desired of the workpiece, A is a constant representing the maximum deviation when φ=90° and φ is the angle of the position of the deviation Y taken from a zero value position selected so that the regression curve best approximates the actual measured deviations from the desired diameter of the workpiece;

computing the corresponding peripheral positions of Dx and Dn relative to the peripheral position of said Df at said gauging station, said computation of the diameters and positions of Dx and Dn excluding gauged values in the angular range of 30° to either side of the peripheral position of Df at said gauging station;

computing and controlling a correction factor X of the roll gap of a No. i rolling stand disposed next upstream of said workpiece gauging station on the basis of the values of Df, Dx and Dn so as to change the values of Dx and Dn and to attain equality between the value of Dn+(Dx−Dn)/2 and the desired diameter $\overline{D}$; and computing and controlling a correction factor Y of the roll gap of a No. (i−1) rolling stand disposed next upstream of said No. i rolling stand so as to maintain the value of Df constant and between the values of Dx and Dn.

5. A method of controlling the profile of a moving bar or like workpiece in a rolling mill comprising the steps of:

disposing about said workpiece gauging means for continuously gauging for said workpiece its roll-free diameter Df, its maximum diameter Dx and its minimum diameter Dn, other than said roll-free diameter Df;

continuously gauging Df, Dx and Dn and the corresponding peripheral positions of Dx and Dn;

computing and setting a value for the desired tension $\overline{\sigma}$ to be imparted to a No. i rolling stand disposed next upstream of said workpiece gauging means for maintaining the value of Df constant and between the values of Dx and Dn, said desired tension $\overline{\sigma}$ being computed in accordance with the relationship $$\overline{\sigma} = \frac{k}{K} \cdot \frac{Df - \overline{D}}{Df},$$

where k is the deformation resistance of the workpiece, K is the tension-breadth change conversion coefficient; and $\overline{D}$ is the desired diameter of the workpiece between Dx and Dn; and controlling the rotation speed of the rolls of a No. (i−1) rolling stand disposed next upstream of said No. i rolling stand to establish said desired tension.

6. A method of controlling the profile of a moving bar or like workpiece in a rolling mill comprising the steps of:

disposing about said workpiece gauging means for continuously gauging for said workpiece its roll-free diameter Df, its maximum diameter Dx and its minimum diameter Dn, other than said roll-free diameter Df;

continuously gauging Df, Dx and Dn and the corresponding peripheral positions of Dx and Dn;

computing and setting a value for the desired tension $\overline{\sigma}$ to be imparted to a No. i rolling stand disposed next upstream of said workpiece gauging means for maintaining the value of Df constant and between the values of Dx and Dn;

controlling the rotation speed of the rolls of a No. (i−1) rolling stand disposed next upstream of said No. i rolling stand to establish said desired tension; and controlling the roll gap at said No. i rolling stand to attain equality between the value of Dn+(Dx−Dn)/2 and the desired diameter $\overline{D}$ by changing a correction factor X of the roll gap of said No. i rolling stand on the basis of the gauged values of Dx and Dn, said correction factor X being computed in accordance with the relationship $$X = \frac{2\overline{D} - Dx - Dn}{1 + \sin \theta},$$

where $\overline{D}$ is the desired diameter of the workpiece and θ is the angle of the position of Dx measured from the position of Df.

7. A method of controlling the profile of a moving bar or like workpiece in a rolling mill comprising the steps of:

disposing about said workpiece gauging means for continuously gauging for said workpiece its roll-free diameter Df, its maximum diameter Dx and its minimum diameter Dn, other than said roll-free diameter Df;

continuously gauging Df, Dx and Dn and the corresponding peripheral positions of Dx and Dn;

computing and setting a value for the desired tension σ to be imparted to a No. i rolling stand disposed next upstream of said workpiece gauging means for maintaining the value of Df constant and between the values of Dx and Dn, said desired tension σ being computed in accordance with the relationship $$\overline{\sigma} = \frac{k}{K} \cdot \frac{Df - \overline{D}}{Df},$$

where k is the deformation resistance of the workpiece, K is the tension-breadth change conversion coefficient; and $\overline{D}$ is the desired diameter of the workpiece between Dx and Dn;

controlling the rotation speed of the rolls of a No. (i−1) rolling stand disposed next upstream of said No. i rolling stand to establish said desired tension; and controlling the roll gap at said No. i rolling stand to attain equality between the value of Dn+(Dx−Dn)/2 and the desired diameter $\overline{D}$ by changing a correction factor X of the roll gap of said No. i rolling stand on the basis of the gauged values of Dx and Dn.

8. A method of controlling the profile of a moving bar or like workpiece in a rolling mill comprising the steps of:

disposing about said workpiece gauging means for continuously gauging for said workpiece its roll-free diameter Df, its maximum diameter Dx and its minimum diameter Dn, other than said roll-free diameter Df;

continuously gauging Df, Dx and Dn and the corresponding peripheral positions of Dx and Dn;

computing and controlling a correction factor X of the roll gap of a No. i rolling stand disposed next upstream of said workpiece gauging means on the basis of the values of Df, Dx and Dn so as to change the values of Dx and Dn and to attain equality between the value of Dn+(Dx−Dn)/2 and the desired diameter $\overline{D}$, said correction factor X being computed in accordance with the relationship $$X = \frac{2\overline{D} - Dx - Dn}{1 + \sin\theta},$$

where $\overline{D}$ is the desired diameter of the workpiece and $\theta$ is the angle of the position of Dx measured from the position of Df; and computing and controlling a correction factor Y of the roll gap of a No. (i−1) rolling stand disposed next upstream of said No. i rolling stand so as to maintain the value of Df constant and between the values of Dx and Dn.

* * * * *